US012688843B2

(12) United States Patent
Sagawai et al.

(10) Patent No.: US 12,688,843 B2
(45) Date of Patent: Jul. 21, 2026

(54) NOTIFICATION APPARATUS, CONTROL PROGRAM FOR NOTIFICATION APPARATUS, AND SEAT SYSTEM

(71) Applicant: Alps Alpine Co., Ltd., Tokyo (JP)

(72) Inventors: Shinichi Sagawai, Miyagi (JP); Kunio Sato, Miyagi (JP)

(73) Assignee: Alps Alpine Co., Ltd. (JP)

( * ) Notice: Subject to any disclaimer, the term of this patent is extended or adjusted under 35 U.S.C. 154(b) by 137 days.

(21) Appl. No.: 18/635,169

(22) Filed: Apr. 15, 2024

(65) Prior Publication Data

US 2024/0274111 A1 Aug. 15, 2024

Related U.S. Application Data

(63) Continuation of application No. PCT/JP2022/036968, filed on Oct. 3, 2022.

(30) Foreign Application Priority Data

Oct. 25, 2021 (JP) ................................ 2021-173709

(51) Int. Cl.

| | |
|---|---|
| ***G10K 11/178*** | (2006.01) |
| ***A47C 7/62*** | (2006.01) |
| ***B06B 1/02*** | (2006.01) |
| ***B06B 1/04*** | (2006.01) |
| ***B06B 1/06*** | (2006.01) |
| ***B60N 2/90*** | (2018.01) |
| ***G06F 3/01*** | (2006.01) |
| ***G08B 6/00*** | (2006.01) |
| ***H04R 1/00*** | (2006.01) |
| ***H04R 1/02*** | (2006.01) |

(52) U.S. Cl.
CPC .............. *G10K 11/178* (2013.01); *G08B 6/00* (2013.01)

(58) Field of Classification Search
None
See application file for complete search history.

(56) References Cited

U.S. PATENT DOCUMENTS

| | | | | |
|---|---|---|---|---|
| 11,765,540 | B2 * | 9/2023 | You ......................... | H04S 7/303 381/302 |
| 2018/0203509 | A1 | 7/2018 | Yamano et al. | |
| 2020/0070701 | A1 * | 3/2020 | David ...................... | B60N 2/90 |

(Continued)

FOREIGN PATENT DOCUMENTS

| | | | |
|---|---|---|---|
| JP | 2008-77631 | A | 4/2008 |
| JP | 2010-258807 | A | 11/2010 |

(Continued)

*Primary Examiner* — Qin Zhu
(74) *Attorney, Agent, or Firm* — Harness, Dickey & Pierce, P.L.C.

(57) ABSTRACT

A notification apparatus is attached to an object and alerts a user who uses the object by presenting a tactile sensation due to vibration. The notification apparatus includes a signal output unit configured to output a drive signal having a signal pattern with a drive frequency corresponding to an event type, an actuator configured to be driven by the drive signal, a sound output unit configured to output sound waves, and a controller configured to determine whether to output cancelling sound waves for cancelling sound waves induced by vibration of the actuator from the sound output unit based on a drive frequency of the drive signal.

11 Claims, 8 Drawing Sheets

(56) References Cited

U.S. PATENT DOCUMENTS

| | | | | |
|---|---|---|---|---|
| 2020/0079248 | A1* | 3/2020 | Yamamoto | B60N 2/0025 |
| 2020/0156795 | A1* | 5/2020 | Knight | F16F 15/002 |
| 2020/0298798 | A1* | 9/2020 | Yamamoto | G08B 25/10 |
| 2020/0398700 | A1* | 12/2020 | Migneco | B60Q 9/00 |
| 2022/0277726 | A1 | 9/2022 | Takeda et al. | |
| 2023/0197048 | A1* | 6/2023 | Farahanisamani | G10K 11/17881<br>381/71.4 |
| 2023/0391240 | A1* | 12/2023 | Haelvoet | H04R 9/06 |
| 2024/0270140 | A1* | 8/2024 | Inose | A47C 7/02 |

FOREIGN PATENT DOCUMENTS

| | | | |
|---|---|---|---|
| JP | 2012-105147 | A | 5/2012 |
| WO | 2013-084958 | A1 | 6/2013 |
| WO | 2017-43400 | A1 | 3/2017 |
| WO | 2021-044901 | A1 | 3/2021 |

* cited by examiner

FIG. 5

| EVENT TYPE | FIRST FREQUENCY | SECOND FREQUENCY | SIGNAL PATTERN | PREDETERMINED FREQUENCY BAND |
|---|---|---|---|---|
| A | f11 | f21 | S1 | f10 - f12<br>f20 - f22 |
| B | f12 | f22 | S2 | f11 - f13<br>f21 - f23 |
| ⋮ | ⋮ | ⋮ | ⋮ | ⋮ |

FIG. 6

| EVENT TYPE | DRIVE FREQUENCY | SIGNAL PATTERN |
|---|---|---|
| A | f21 | T1 |
| B | f22 | T2 |
| ⋮ | ⋮ | ⋮ |

FIG. 7A
FIG. 7B
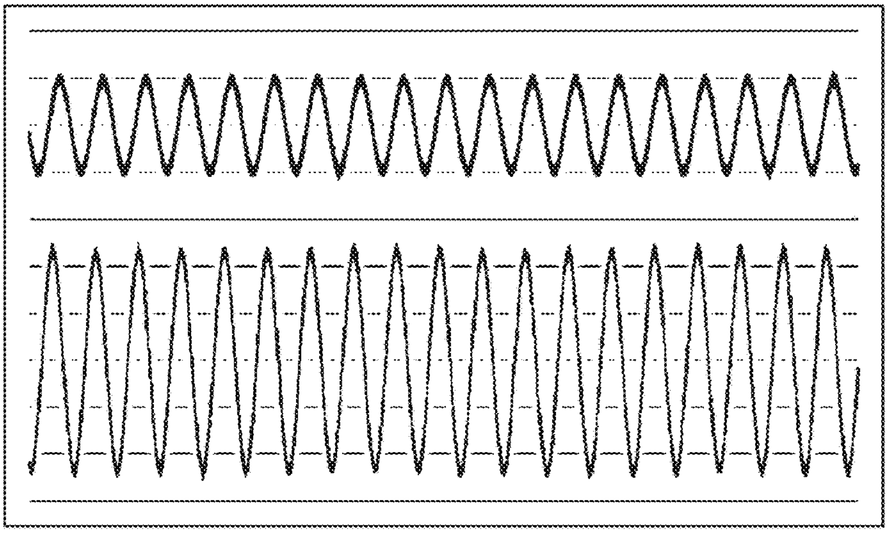
FIG. 7C
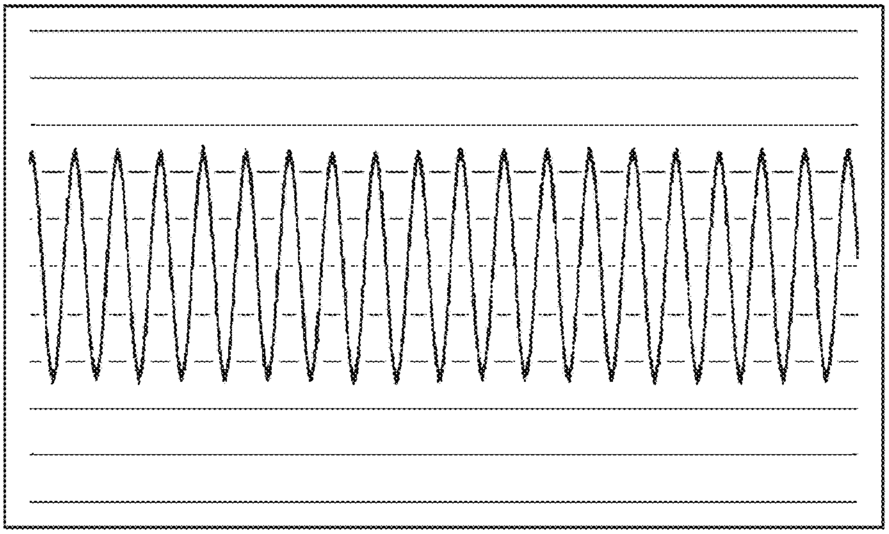
FIG. 7D
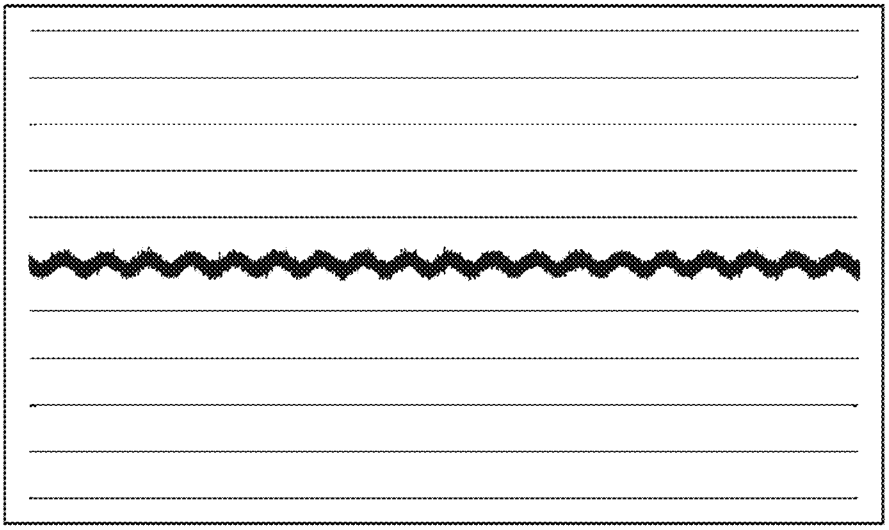

NOTIFICATION APPARATUS, CONTROL PROGRAM FOR NOTIFICATION APPARATUS, AND SEAT SYSTEM

CLAIM OF PRIORITY

This application is a Continuation of International Application No. PCT/JP2022/036968 filed on Oct. 3, 2022, which claims benefit of Japanese Patent Application No. 2021-173709 filed on Oct. 25, 2021. The entire contents of each application noted above are hereby incorporated by reference.

BACKGROUND OF THE INVENTION

1. Field of the Invention

The present disclosure relates to a notification apparatus, a control program for the notification apparatus, and a seat system.

2. Description of the Related Art

There is a known apparatus in the related art for presenting information by vibrating a vibrator (actuator) provided at, for example, the seat of a vehicle to make the driver sense the vibration. Such an apparatus is known to guide the driver to the destination by presenting dangerous situations to the driver as vibration alarms or presenting vibration to the driver in turning to the right or left based on navigation information (for example, see Japanese Unexamined Patent Application Publication No. 2008-77631).

The apparatus disclosed in Japanese Unexamined Patent Application Publication No. 2008-77631 may generate sound from the seat or the apparatus itself because of the resonance frequency of the seat or the apparatus itself depending on the drive frequency of the actuator. The generation of such sound is undesirable in some cases.

SUMMARY OF THE INVENTION

The present disclosure provides a notification apparatus capable of reducing the sound induced by the vibration of the actuator, a control program for the notification apparatus, and a seat system.

In a first aspect of the present disclosure, a notification apparatus attached to an object, the notification apparatus alerting a user who uses the object by presenting a tactile sensation due to vibration, includes a signal output unit configured to output a drive signal having a signal pattern with a drive frequency corresponding to an event type, an actuator configured to be driven by the drive signal, a sound output unit configured to output sound waves, and a controller configured to determine whether to output cancelling sound waves for cancelling sound waves induced by vibration of the actuator from the sound output unit based on a drive frequency of the drive signal.

In a second aspect of the present disclosure, a control program for a notification apparatus attached to an object, the notification apparatus alerting a user who uses the object by presenting a tactile sensation due to vibration, the notification apparatus including an actuator configured to generate vibration and a sound output unit configured to output sound waves, wherein the control program provides instructions for a computer of the notification apparatus to output a drive signal having a signal pattern with a drive frequency corresponding to an event type to vibrate the actuator and determine whether to output cancelling sound waves for cancelling sound waves induced by vibration of the actuator from the sound output unit based on a drive frequency of the drive signal.

In a third aspect of the present disclosure, a seat system includes a seat and a notification apparatus that alerts a user by presenting a tactile sensation due to vibration, wherein the notification apparatus includes a signal output unit configured to output a drive signal having a signal pattern with a drive frequency corresponding to an event type, an actuator configured to be driven by the drive signal, a sound output unit configured to output sound waves, and a controller configured to determine whether to output cancelling sound waves for cancelling sound waves induced by vibration of the actuator from the sound output unit based on a drive frequency of the drive signal.

BRIEF DESCRIPTION OF THE DRAWINGS

FIG. 5 is a diagram illustrating an example of drive signal data stored in a memory;

FIG. 6 is a diagram illustrating cancelling signal data;

FIG. 7A is a diagram illustrating the waveform of the drive signal;

FIG. 7B is a diagram illustrating the vibrational waveform before vibrational sound waves are cancelled;

FIG. 7C is a diagram illustrating the waveform of cancelling sound waves;

FIG. 7D is a diagram illustrating the vibrational waveform after vibrational sound waves are cancelled.

DESCRIPTION OF THE PREFERRED EMBODIMENTS

Embodiments of a notification apparatus, a control program for the notification apparatus, and a seat system of the present disclosure will be described hereinbelow. In the following, sound waves refer to propagating waves within an audible frequency range for humans, and sound refers to the pressure fluctuations of sound waves perceived with the acoustic sense of humans, both of which can be used and are sometimes described without strict distinction.

EMBODIMENTS

Figure 1:
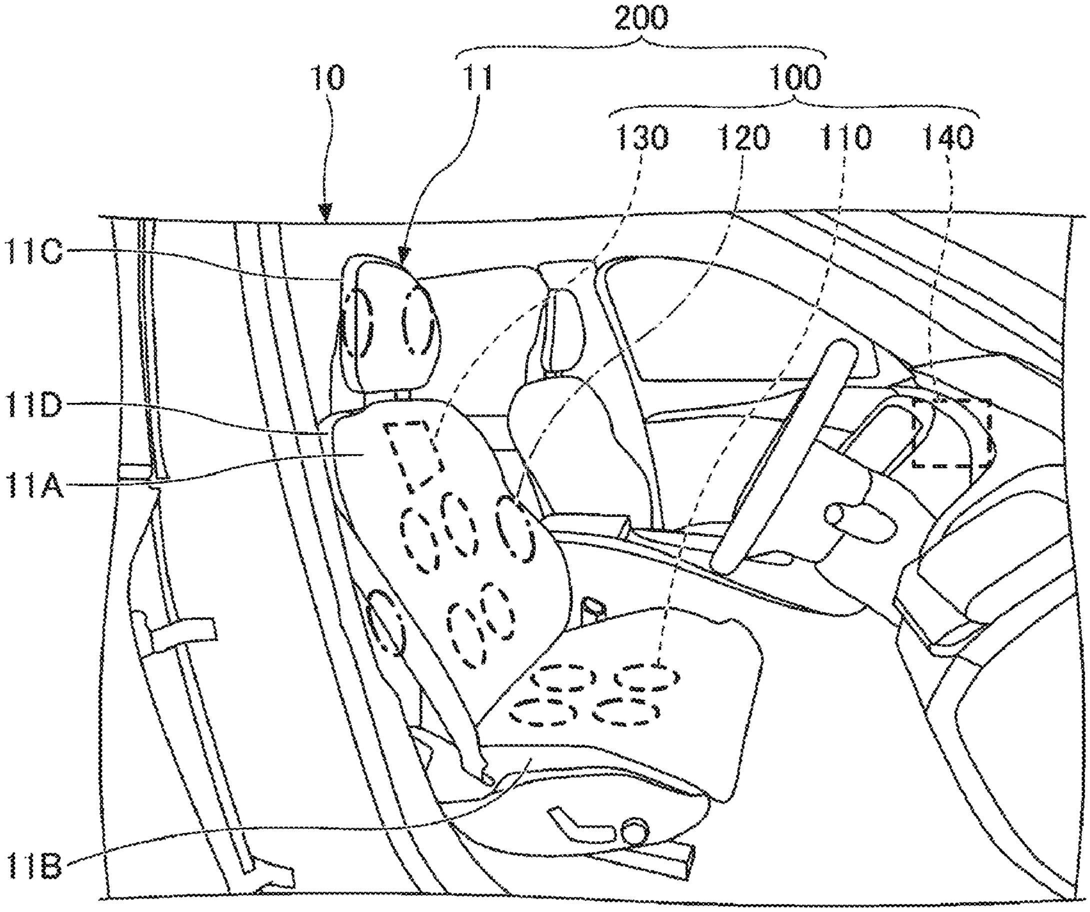
FIG. 1 is a diagram illustrating the interior of a vehicle.

FIG. 1 is a diagram illustrating the interior of a vehicle 10. A seat 11 is disposed in the interior of the vehicle 10. The seat 11 includes a back rest (a seat back) 11A, a seat (a seat cushion) 11B, a head rest 11C, and a seat fabric 11D. The back rest 11A, the seat 11B, and the head rest 11C are covered with the seat fabric 11D.

This embodiment is described using an example in which an example of an object to which a notification apparatus 100, described below, (hereinafter also simply referred to as "object") is the seat 11, and the seat 11 is a driver seat. The user of the seat 11 is therefore the driver. However, the seat

11 may be any seat provided in the vehicle 10, for example, a front passenger seat or a backseat. The seat 11 may be provided at an object other than the vehicle 10. An example of the object is not limited to the seat 11 and may be any object used in contact with at least part of the user's body so that the vibration of the object generated by the notification apparatus 100 is transmitted to the at least part of the body. For example, the object may be a wearable device (for example, of a wristband type, a belt type, or a wearable suit type), a device to assist a person with hearing or visual impairment, or a power-assisted suit for work support. Although, in the following description, the object is the seat 11, the descriptions about the seat 11, including the description about the sound generated from the seat 11, also apply to cases where the object is other than the seat 11.

The vehicle 10 is equipped with a seat system 200 of this embodiment. The seat system 200 includes the seat 11 and the notification apparatus 100. The notification apparatus 100 includes an actuator 110, a speaker 120, an acceleration sensor 130, and a control unit 140. In FIG. 1, the actuator 110 is indicated by a broken line, and the speaker 120 is indicated by a dashed-dotted line. The speaker 120 is an example of a sound output unit.

The notification apparatus 100 is an apparatus for notifying the user seated in the seat 11 of information by driving the actuator 110 provided at the seat 11 to vibrate. The notification of information is performed by presenting vibration to the user. To reliably present vibration to the user, the acceleration of vibrations is typically increased. However, increasing the acceleration of vibration causes a trade-off where sound is more likely to be generated. When the sound induced by the vibration is easily audible to the user, the notification apparatus 100 generates cancelling sound waves from the speaker 120 to cancel the sound due to the vibration.

In one example, the back rest 11A is equipped with four actuators 110, two speakers 120, and one acceleration sensor 130 internally, and the seat 11B is equipped with four actuators 110 internally. The head rest 11C is equipped with two speakers 120 internally. All of the actuators 110, the speakers 120, and the acceleration sensor 130 are covered with the seat fabric 11D. The control unit 140 is disposed on the back of the dashboard, by way of example. The following description is made with reference to FIG. 2 in addition to FIG. 1.

Figure 2:
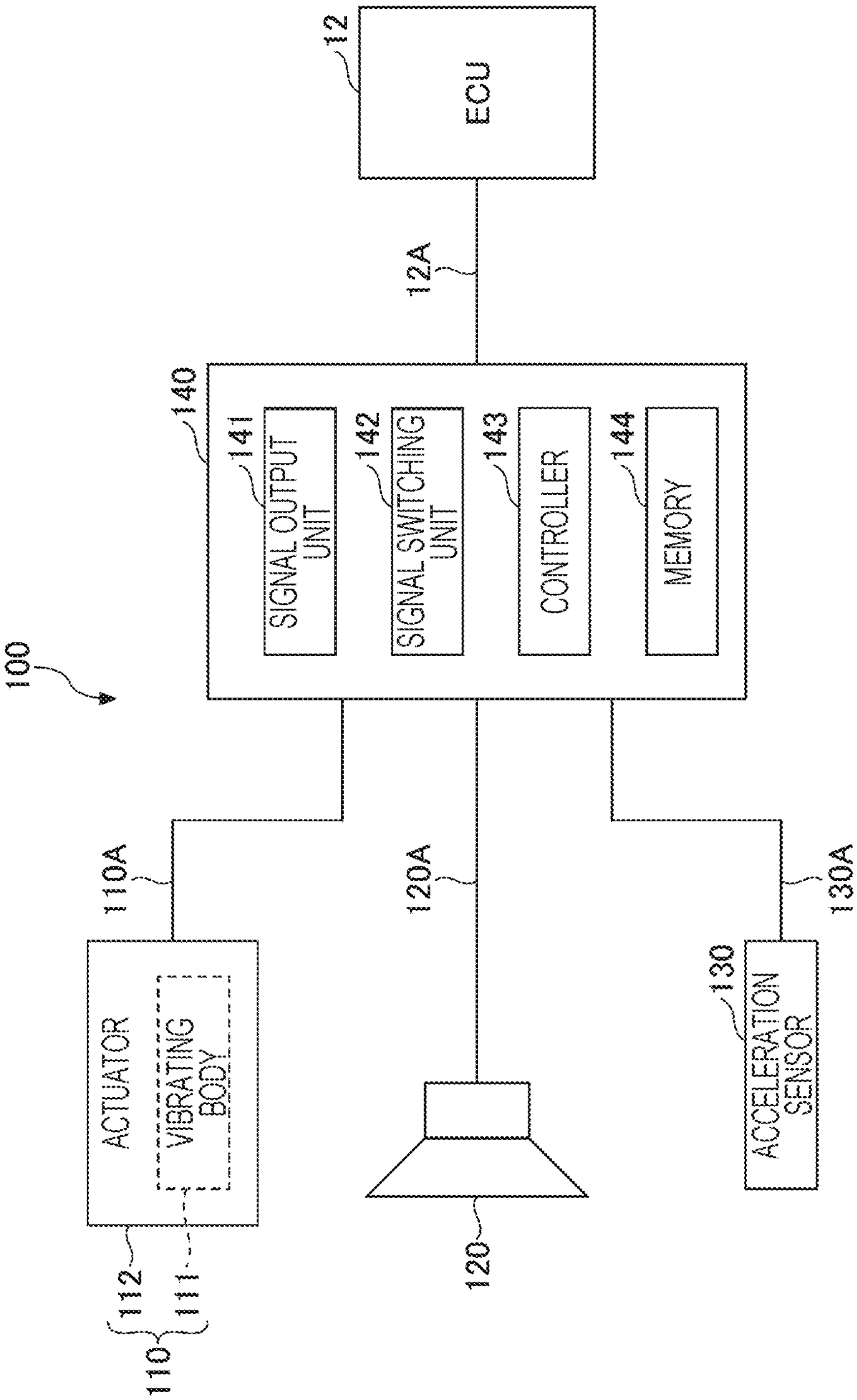
FIG. 2 is a diagram illustrating the configuration of a notification apparatus.

FIG. 2 is a diagram illustrating the configuration of the notification apparatus 100. Although FIG. 2 illustrates one actuator 110 and on speaker 120 in a simplified manner, multiple actuators 110 and speakers 120 are actually connected to the control unit 140 as illustrated in FIG. 1.

FIG. 2 illustrates an electronic control unit (ECU) 12 in addition to the notification apparatus 100. In one example, the ECU 12 is an ECU for controlling a navigation system for the vehicle 10. Although the ECU 12 in this case is an ECU for controlling the navigation system, the ECU 12 may be an ECU other than the ECU for controlling the navigation system. The control unit 140 may be included in the ECU 12.

The actuator 110, the speaker 120, and the acceleration sensor 130 are connected to the control unit 140 via communication cables 110A, 120A, and 130A, respectively. The control unit 140 is connected to the ECU 12 via a communication cable 12A. The driving of the actuator 110 and the speaker 120 is controlled by the control unit 140. The control unit 140 sometimes use the detection result of the acceleration sensor 130 when controlling the driving of the actuator 110 and the speaker 120.

In one example, the communication cables 110A, 120A, 130A, and 12A are communication cables based on the controller area network (CAN) standard. The communication between the actuator 110, the speaker 120, the acceleration sensor 130, and the ECU 12, and the control unit 140 is not limited to cable communication via the communication cables 110A, 120A, 130A, and 12A, respectively, part or all of which may be wireless communication.

Configuration and Operation of Actuator

As illustrated in FIG. 1, the actuators 110 are arranged in a 2×2 configuration, with four each located at the back rest 11A and the seat 11B. The actuators 110 are driven in response to drive signals output from a signal output unit 141 of the control unit 140 (see FIG. 2) to generate vibrations. Driving the actuators 110 causes the seat 11 serving as the object to vibrate.

Each actuator 110 may include a vibrating body 111 and a casing 112, as illustrated in FIG. 2. The vibrating body 111 is covered with the casing 112. When the actuator 110 is supplied with a drive signal, the actuator 110 vibrates the vibrating body 111 based on the input drive signal. When the vibrating body 111 vibrates, the casing 112 also vibrates. The vibration of the actuator 110 is transmitted to the seat 11.

The actuator 110 may be any actuator that vibrates the vibrating body 111 relative to the casing 112 by being driven in response to the drive signal. Examples of the actuator 110 include a voice coil motor (VCM), a linear actuator (either a resonant type or a nonresonant type), and a piezoelectric actuator having a piezoelectric element serving as a vibrating body. The casing 112 may be any casing that covers the vibrating body 111, for example, a resin box-shaped case. The actuator 110 is fixed to the seat 11 by the casing 112 being attached to the seat 11.

Vibration of the vibrating body 111 may produce sound from the casing 112 and produce sound from the seat 11. The sound generated from the casing 112 is large particularly when the actuator 110 has resonance frequency characteristics with a high-quality factor (Q) value. The sound generated from the seat 11 is large when the seat 11 generates a natural vibration. Thus, the sound generated from the casing 112 of the actuator 110 and the sound generated from the seat 11 are sound induced by the vibration of the actuator 110, which is an example of sound waves induced by the vibration of the actuator 110.

The sound induced by the vibration of the actuator 110 (an example of the sound waves induced by the vibration of the actuator 110) is hereinafter referred to as vibrational sound waves. The vibrational sound waves include at least one or both of the sound generated from the casing 112 of the actuator 110 and the sound generated from the seat 11.

Configuration and Operation of Speaker

The speaker 120 is an example of a sound output unit that outputs sound waves. The speaker 120 is driven by a controller 143 of the control unit 140. When the controller 143 supplies a cancelling signal to the speaker 120, the speaker 120 outputs cancelling sound waves. The drive signal output from the signal output unit 141 of the control unit 140 to the actuator 110 is a drive signal with repeated on and off-periods. The cancelling sound waves are output from the speaker 120 so as to cancel the vibrational sound waves at least during the on-period. The cancelling signal is a signal for driving the speaker 120 to output cancelling sound waves. Although, in the following description, the speaker 120 is used to output cancelling sound waves, the speaker 120 may also be used to output normal sound waves other than the cancelling sound waves.

The speaker 120 is provided on each side of the back rest 11A and on each side of the head rest 11C, one on each side. The two speakers 120 on the opposite sides of the back rest 11A are provided to be oriented to the outside of the back rest 11A from the opposite sides of the back rest 11A. The two speakers 120 on the opposite sides of the head rest 11C are provided to be oriented to the outside of the head rest 11C from the opposite sides of the head rest 11C. In other words, the four speakers 120 in total are oriented to the outside of the seat 11 from the sides of the back rest 11A and the head rest 11C of the seat 11. The orientation of the speakers 120 is the orientation in which the speakers 120 output cancelling sound waves.

The surfaces of the back rest 11A and the head rest 11C of the seat 11 facing the front of the vehicle 10 are oriented to the position of the body of the user seated in the seat 11. For this reason, the four speakers 120 may be oriented in directions different from the direction in which the user's body is positioned with respect to the seat 11 (the front of the vehicle 10), so that the speakers can output cancelling sound waves in the directions different from the direction in which the user's body is positioned with respect to the seat 11.

If the four speakers 120 are disposed in the direction of the user's body with respect to the seat 11, the cancelling sound waves are blocked by the user's body and do not propagate to the space in which vibrational sound waves present. For this reason, the four speakers 120 may be disposed in the directions different from the direction in which the user's body is positioned with respect to the seat 11. This allows the notification apparatus 100 to propagate the cancelling sound waves to the space in which vibrational sound waves are present (the interior of the vehicle 10) to cancel the vibrational sound waves.

In one example, four speakers 120 are provided so as to be oriented to the outside of the seat 11 from the sides of the back rest 11A and the head rest 11C of the seat 11. However, since four speakers 120 only needs to be oriented in the directions different from the orientation of the user's body with respect to the seat 11 (the front of the vehicle 10), the four speakers 120 may be provided so as to be oriented to the outside of the seat 11 from the rear surfaces or the upper surfaces of the back rest 11A and the head rest 11C.

The speakers 120 are driven by the control unit 140 to output cancelling sound waves. Cancelling the vibrational sound waves refers to at least decreasing the sound pressure level of the vibrational sound waves perceived by humans with the cancelling sound waves, not decreasing the sound pressure level of the vibrational sound waves to zero. The sound pressure level of the vibrational sound waves may be decreased so as to become below a sound pressure level perceived by humans by the cancelling sound waves. The vibrational sound waves are essentially undesirable sound waves and are unwanted noise in the interior of the vehicle 10 and may therefore be reduced to a sound pressure level not perceived by the user with cancelling sound waves. The state of the wave forms when the vibrational sound waves are canceled by the cancelling sound waves will be described later with reference to FIGS. 7A to 7D. The seat system 200 may include a speaker other than the speakers 120. In this case the speaker other than the speakers 120 does not need to be oriented in a direction different from the direction of the user's body with respect to the seat 11, like the speakers 120. The control unit 140 may cause the speakers 120 of the speakers in the seat system 200 to selectively output cancelling sound waves.

Configuration and Operation of Acceleration Sensor

The acceleration sensor 130 is an example of a vibration detector for detecting vibrations and is disposed above the four actuators 110 of the back rest 11A of the seat 11.

The acceleration sensor 130 can detect vibrations generated in the seat 11 due to external vibrations by detecting vibrations with the actuators 110 not driven. The external vibrations are vibrations brought from the outside of the notification apparatus 100, for example, vibrations generated in the moving vehicle 10. The vibrations generated in the moving vehicle 10 are vibrations that produce road noise and so on. The acceleration sensor 130 may detect vibrations at any timing in a state in which each actuator 110 is not driven. The state in which the actuator 110 is not driven is a state in which the actuator 110 is supplied with no drive signal. The state in which the actuator 110 is not driven does not include a drive-signal off-period during which an on-period and an off-period are repeated, because remaining vibrations, described below, may be generated.

The actuator 110 is intermittently driven by a drive signal in which the on-period and the off-period are repeated. The off-period is a period during which the drive signal level is zero, with the actuator 110 in operation, here which is assumed to be a state in which the actuator 110 is driven. The casing 112 and the seat 11 may produce sound due to the vibration of the actuator 110, while the casing 112 and the seat 11 may produce sound due to remaining vibrations that can be generated when the actuator 110 is during the off-period. The sound induced by the remaining vibrations may be smaller than the sound due to the vibration of the actuator 110 but is normally undesirable like the sound induced by the vibration of the actuator 110. Accordingly, before describing the control unit 140, this section describes the drive signal and the remaining vibrations with reference to FIG. 3.

Waveform of Drive Signal and Vibration Waveform of Actuator

Figure 3:
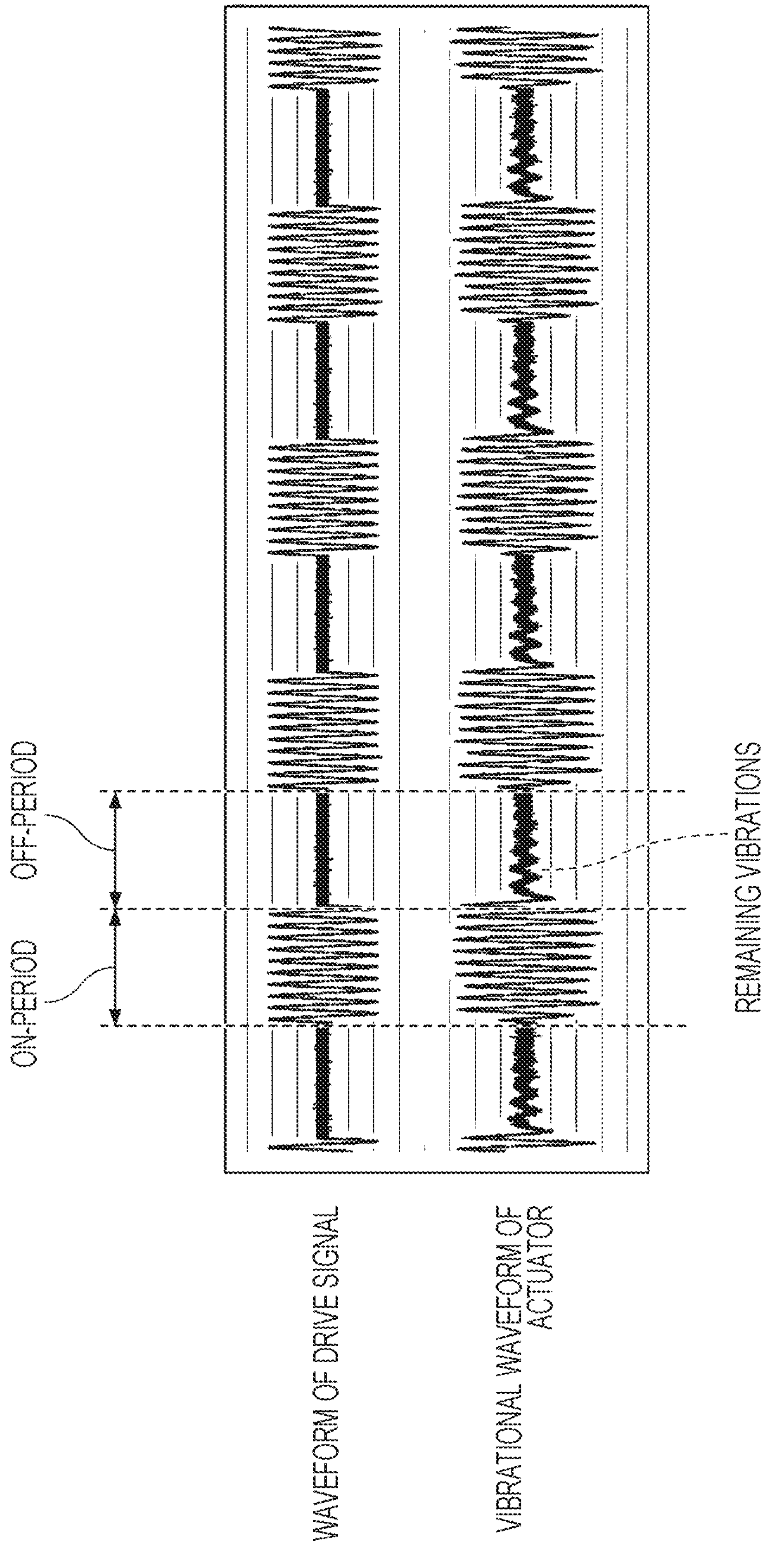
FIG. 3 is a diagram illustrating an example of the waveform of the drive signal and the vibrational waveform of an actuator.

FIG. 3 is a diagram illustrating an example of the waveform of the drive signal and the vibrational waveform of the actuator 110. In FIG. 3, time is represented on the horizontal axis, and amplitude is represented on the vertical axis. FIG. 3 illustrates the waveform of the drive signal at the top, while the vibrational waveform of the actuator 110 at the bottom.

The drive signal may be a pulse width modulation (PWM) drive signal with an intermittent drive pattern having an on-period during which pulse waves continue and an off-period without pulse waves. More specifically, an example of the drive signal is a drive signal with an intermittent drive pattern having an on-period during which pulse waves with a frequency of 50 Hz or higher and 400 Hz or lower continue for 40 milliseconds or more and an off-period without pulse waves. In one example, the duty ratio of the drive signal is 50%, and the durations of the on-period and the off-period are equal, but may be unequal. The duration of continuous one on-period and one off-period corresponds to one cycle of the drive signal. In one example, the drive signal illustrated in FIG. 3 has a signal pattern with a drive frequency of 250 Hz and having ten pulses during the on-period of 40 milliseconds.

As illustrated in FIG. 3, the actuator 110 has a vibrational waveform reflecting the pulses of the drive signal during the on-period and a vibrational waveform with a minimal amplitude during the off-period. The vibrational waveform with a minimal amplitude during the off-period is due to remaining vibrations. The remaining vibrations will be described later.

The reason why the drive signal includes pulse waves with a frequency of 50 Hz higher and 400 Hz or lower is that a vibration with a frequency of 50 Hz or higher and 400 Hz or lower is easy for humans to perceive. However, particularly when the actuator 110 is driven by a drive signal with a frequency of 200 Hz or higher, vibrational sound waves are likely to be generated. For this reason, it is effective to cancel the vibrational sound waves with cancelling sound waves. To make the drive frequency of the drive signal 50 Hz or higher and 400 Hz or lower, components with a frequency band of 50 Hz or higher and 400 Hz or lower are extracted by filtering (lowpass filtering or bandpass filtering).

The pulse waves are continued for 40 milliseconds or more during the on-period in order to tell the user that the vibrations are mechanical vibrations. For example, unlike a tactile sensation due to a vibration caused by a human's motion, a natural phenomenon, or the like, multiple continuous vibrations allow the sensory organ of human skin to detect a tactile sensation due to mechanical vibrations than one time of large vibration. The duration of 40 milliseconds was derived by an experiment. A duration shorter than 40 milliseconds drastically increased the number of testees who determine that the vibration is generated because of a human's motion, a natural phenomenon, or the like, not mechanical vibrations. In one example, the optimum value of the on-period obtained by an experiment was 80 milliseconds. A typical example of the vibration caused by a human's motion, a natural phenomenon, or the like is a vibration caused by another person lightly tapping on a body part. A typical example of the mechanical vibrations is multiple vibrations that are so quick and continuous that they cannot be caused by a human's motion, a natural phenomenon, or the like.

The vibration of the actuator 110 may cause the casing 112 or the seat 11 to generate sound, as described above. The sound generated by the casing 112 due to the vibration of the actuator 110 is large particularly when the actuator 110 has resonant frequency characteristics with a high Q-value. The sound generated by the seat 11 due to the vibration of the actuator 110 is large when a natural vibration is generated from the seat 11.

Likewise, the casing 112 or the seat 11 may generate sound due to remaining vibrations during the off-period. The remaining vibrations can occur either in the actuator 110 or in the seat 11 and can cause sound. The remaining vibrations are likely to occur particularly when the actuator 110 has resonant frequency characteristics with a high Q-value or when the seat 11 has a natural frequency close to the frequency of the drive signal.

The sound generated due to the vibration of the actuator 110 may be long depending on the vibration property of the actuator 110, the structure of the seat 11, or the like. When the vibration generated by the actuator 110 during the on-period is large, the remaining vibrations and the sound generated due to the remaining vibrations are large.

An example of a method for cancelling the sound generated due to the vibration of the actuator 110 is a method of generating a cancelling signal capable of cancelling (offsetting) various vibrations of the actuator 110 and storing the cancelling signal in a memory 144 in advance and reading the cancelling signal from the memory 144 to cause the speaker 120 to output cancelling sound waves. Such a method is available also in cancelling sound generated due to remaining vibrations during the off-period. The cancelling sound waves are, during the off-period, in opposite phase to the sound waves due to the remaining vibrations of the actuator 110.

Configuration and Control Process of Control Unit

The control unit 140 drives the actuator 110 when receiving a notification from the ECU 12 that predetermined notification conditions are satisfied. The predetermined notification conditions are necessary to issue a notification or the like to a user seated in the seat 11. Specifically, the ECU 12 notifies the control unit 140 that the predetermined notification conditions have been satisfied when the ECU 12 has detected that the user is approaching an intersection to provide guidance on the route or the destination set by the navigation system, or when the ECU 12 issues an alarm for deviation from the lane. The ECU 12 may determine whether the predetermined notification conditions have been satisfied and notify the control unit 140 of the satisfaction of the predetermined notification conditions on the precondition that a seat sensor or the like has detected that the user of the vehicle is seated, or if the seat 11 is a driver's seat, the ignition is on.

The control unit 140 may include a signal switching unit 142, in addition to the signal output unit 141, the controller 143, and the memory 144, as illustrated in FIG. 2. The control unit 140 is implemented by a computer including a central processing unit (CPU), a random access memory (RAM), a read only memory (ROM), an input/output interface, and an internal bus. The signal output unit 141, the signal switching unit 142, and the controller 143 are the functions of programs executed by the control unit 140 as functional blocks. The memory 144 is a functional representation of the memory of the control unit 140.

Process Performed by Signal Output Unit and Drive Signal Data

The signal output unit 141 outputs a drive signal having a drive-frequency signal pattern corresponding to the event type to the actuator 110. One example of the event is that the vehicle is approaching an intersection to provide guidance on the route or the destination set by the navigation system. The memory 144 stores data representing drive signals having drive-frequency signal patterns that vary from an event type to another. The signal output unit 141 reads a drive signal corresponding to the event type reported from the ECU 12 from the memory 144 and outputs the dive signal to the actuator 110. Thus, the actuator 110 is driven using the drive signal.

Signal patterns of the drive signals, vibrations generated by the driving of the actuator 110, and the sound induced by the vibrations will be described with reference to FIGS. 4A to 4D. FIGS. 4A to 4D illustrate the signal patterns of the drive signals and vibrations and sound generated by the driving of the actuator 110. FIGS. 4A to 4D individually illustrate three waveforms vertically. The top waveform is the waveform of a drive signal supplied to the actuator 110. The middle waveform is the vibrational waveform of the actuator 110. The bottom is the spectrogram of the vibrational waveform of the actuator 110, illustrating the temporal change of the frequency component. In one example, the spectrogram of the vibrational waveform is generated using wavelet transformation.

Figure 4A:
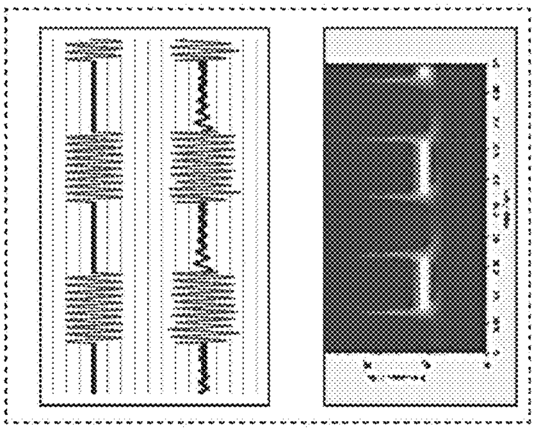
FIGS. 4A to 4D are diagrams illustrating the signal patterns of the drive signals and vibrations and sound generated by the driving of the actuator.
Figure 4B:
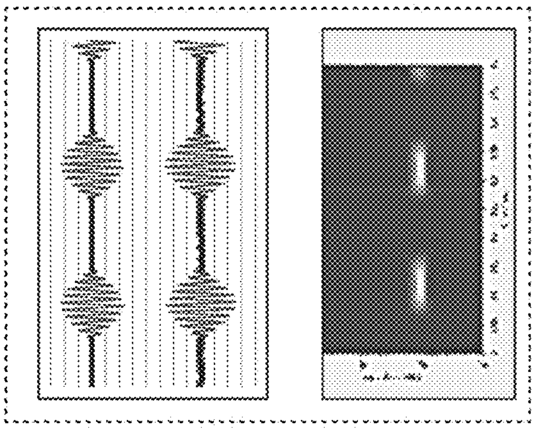
Figure 4C:
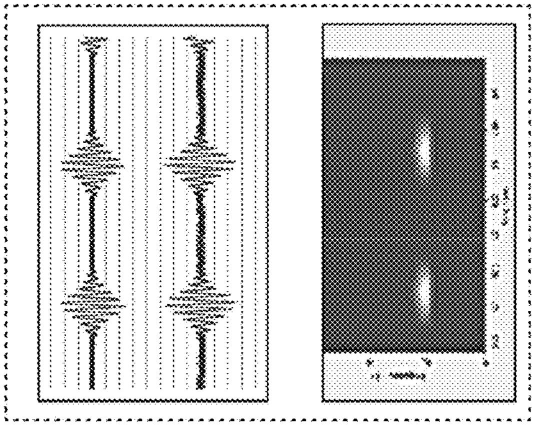
Figure 4D:
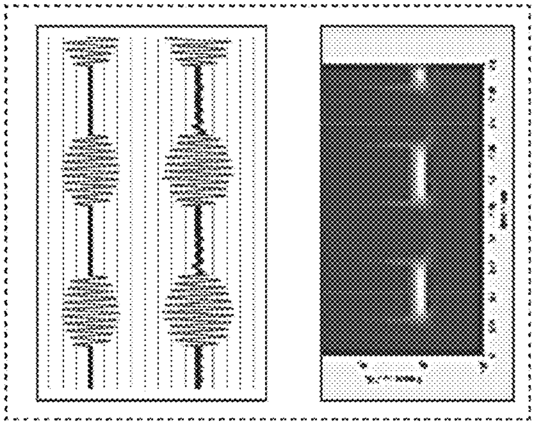

The top waveform of the drive signal in FIG. 4A is a waveform without signal processing to smooth the drive signal envelope. The waveforms of the top drive signals in FIGS. 4B to 4D are waveforms with signal processing to smooth the drive signal envelope. The signal processing to smooth the drive signal envelope is a process for attenuating the drive signal so as to smooth the changes in the waveform of the envelope at the rising and falling during the on-period. Of the top drive signals in FIGS. 4B to 4D, the drive signal in FIG. 4C undergoes the highest degree of signal processing, the drive signal in FIG. 4B undergoes a little lower degree of signal processing than the drive signal in FIG. 4C, and the drive signal in FIG. 4D undergoes the lowest degree of signal processing.

The top waveforms of the drive signals in FIGS. 4A to 4D have, for example, a drive frequency of 100 Hz and a signal pattern including ten pulses during the on period. When the actuator 110 was driven with the top drive signals in FIGS. 4A to 4D, the vibrations represented by the middle waveforms in FIGS. 4A to 4D occurred in the actuator 110, respectively. As can be seen from the middle waveforms in FIGS. 4A to 4D, the vibrations generated in the actuator 110 were the same as the waveforms of the drive signals. When the actuator 110 was driven by a drive signal processed so as to smooth the drive signal envelope, like the top drive signals in FIGS. 4B to 4D, changes in the envelope at the rising and falling were smoothed, like the middle waveforms in FIGS. 4B to 4D.

For the bottom waveforms of the sound waves due to the vibration of the actuator 110 illustrated in FIGS. 4A to 4D, sharp peaks like hones were generated at the rising and falling timings of the drive signals in FIGS. 4A and 4D. The frequencies of the sound waves after the rising and before the falling were about 100 Hz, while the frequencies of the steep peaks generated at the rising and falling timings during the on-period were from about 800 Hz to 1,000 Hz.

In this embodiment, the frequency band in which the vibrations can easily be cancelled by the cancelling sound waves output from the speaker 120 is higher than or equal to 50 Hz and lower than or equal to 400 Hz. Therefore, the sound waves, like the bottom sound waves in FIGS. 4A and 4D, generated at the rising and falling timings during the on-period due to the vibration of the actuator 110, are not easy to cancel. In contrast, in FIGS. 4B and 4C, no steep peaks occurred at the rising and falling timings of the on-period, and the frequency of the sound waves was about 100 Hz.

Thus, driving the actuator 110 with the top drive signals in FIGS. 4B and 4C allows the sound induced by the vibration to be cancelled by the cancelling sound waves output from the speaker 120. However, if the actuator 110 is driven with the top drive signals shown in FIGS. 4A and 4D, the sound induced by the vibration cannot be cancelled by the cancelling sound waves output from the speaker 120.

To enable the sound waves induced by the vibration of the actuator 110 to be cancelled by the cancelling sound waves, it is preferable to smooth changes in the drive signal envelope at the rising and falling by signal processing to smooth the envelope. It was found that it is preferable to smooth the changes in the envelope at the rising and falling to the levels of the top drive signals in FIGS. 4B and 4C and that the top drive signal in FIG. 4D is not at a sufficient level of signal processing to smooth the drive signal envelope.

Therefore, the notification apparatus 100 stores drive signal data representing the drive signal subjected to appropriate signal processing to smooth the drive signal envelope, like the top drive signals in FIGS. 4B and 4C, in the memory 144.

The following description is made for a configuration in which drive signal data representing the drive signal subjected to signal processing to smooth the envelope of the drive signal is stored in the memory 144. However, drive signal data representing the drive signal without signal processing to smooth the envelope of the drive signal (see the top waveform in FIG. 4A may be stored in the memory 144. When the signal output unit 141 reads the drive signal data from the memory 144 to output the drive signal to the actuator 110, the drive signal may be output to the actuator 110 after being processed to smooth the envelope of the drive signal.

Next, the drive signal data representing the drive signal to be stored in the memory 144 will be described. FIG. 5 is a diagram illustrating an example of the drive signal data stored in the memory 144. The drive signal data is data representing an event type, multiple drive frequencies (a first frequency and a second frequency), a signal pattern, and a predetermined frequency band associated with each event type.

For example, for the drive signal data of event type A, the first frequency is f11, the second frequency is f21, the signal pattern is S1, and the predetermined frequency band is from f10 to f12 and from f20 to f22. For example, for the drive signal data of event type B, the first frequency is f12, the second frequency is f22, the signal pattern is S2, and the predetermined frequency band is from f11 to f13 and from f21 to f23.

One of the multiple drive frequencies is a drive frequency set as a default (an initial value) for each event, and drive frequencies other than the default are changed drive frequencies for use in frequency hopping, described below. In one example, for the drive signal data of event type A, the first frequency f11 is set as the default (initial) drive frequency. In one example, for the drive signal data of event type B, the second frequency f22 is set as the default (initial) drive frequency.

It is preferable that all of the multiple drive frequencies be the resonant frequency of the actuator 110. If the drive frequency is the resonant frequency, less power is consumed to generate the vibration with the same acceleration than when the drive frequency is not the resonant frequency.

The signal pattern is data representing the pattern of the drive signal. In the case where the drive signal is an intermittent drive signal that repeats on and off, the signal pattern represents the durations of the on-period and the off-period, the amplitude of pulses during the on-period, the number of the pulses, and so on. The amplitude of the pulses corresponds to the acceleration of the vibration of the actuator 110.

The predetermined frequency band is a frequency band related to the frequency hopping, described below. For the drive signal data of event type A, the predetermined frequency band from f10 to f12 including the first frequency f11 and the predetermined frequency band from f20 to f22 including the second frequency f21 are set. For the drive signal data of event type B, the predetermined frequency band from f11 to f13 including the first frequency f12 and the predetermined frequency band from f21 to f23 including the second frequency f22 are set. The predetermined frequency band is provided for the frequency of external vibrations. How to use the predetermined frequency band will be described below.

Increasing the drive frequency, with the amplitude of the drive signal kept constant, the intensity of vibrations that humans recognize with the sense organ of skin decreases. In other words, the higher the frequency of vibration, the higher the acceleration required for humans to sense the vibration. Accordingly, the higher the drive frequency, the higher the acceleration required for vibration. For this reason, the higher the drive frequency, the larger the amplitude of the signal pattern required. Since the acceleration of the vibration of the actuator 110 corresponds to the amplitude of the pulses of the drive signal, the amplitude of the drive signal is increased as the drive frequency increases. Thus, the drive signal is a signal that causes the actuator 110 to vibrate with higher acceleration as the drive frequency increases.

For example, the signal pattern S1 of the drive signal data for event type A should include an amplitude for the first frequency f11 and an amplitude for the second frequency f21. If the second frequency f21 is higher than the first frequency f11, the amplitude for the first frequency f11 should be set to be larger than the amplitude for the second frequency f21. The signal pattern S2 of the drive signal data for event type B should include an amplitude for the first frequency f12 and an amplitude for the second frequency f22. If the second frequency f22 is higher than the first frequency f12, the amplitude for the second frequency f22 should be set to be larger than the amplitude for the first frequency f12.

The signal output unit 141 reads drive signal data from the memory 144 based on the event type sent from the ECU 12 and outputs a drive signal represented by the drive signal data to the actuator 110. This causes the actuator 110 to vibrate in response to the drive signal. Although FIG. 5 illustrates drive signal data in which two frequencies (the first frequency and the second frequency) are associated with one event, three or more frequencies may be associated with one event.

Processing Performed by Signal Switching Unit

When the drive frequency of the drive signal is within the predetermined frequency band (see FIG. 5) including the frequency of the vibration detected by the acceleration sensor 130, the signal switching unit 142 may switch the drive frequency of the drive signal so that the drive frequency of the drive signal goes out of the predetermined frequency band. The switching of the drive frequency of the drive signal is performing frequency hopping for the drive frequency of the drive signal.

As has been described with reference to FIG. 5, the memory 144 stores drive signal data representing multiple drive frequencies for one event, by way of example. Assume that event type A shown in FIG. 5 is an event indicating approaching an intersection to provide guidance on the route set by the navigation system. The first frequency f11 is 100 Hz, and the second frequency f21 is 250 Hz. A drive signal with the first frequency f11 (100 Hz) is used as the default (initial setting). The predetermined frequency band from f10 to f12 for the first frequency f11 (100 Hz) is assumed to be from 80 Hz to 120 Hz, by way of example. The predetermined frequency band from f20 to f22 for the second frequency f21 (250 Hz) is assumed to be from 220 Hz to 280 Hz, by way of example.

Assume that, when a notification of approaching the intersection is given from ECU 12, and the actuator 110 is driven in response to a drive signal with the first frequency f11 (100 Hz), the seat 11 of the moving vehicle 10 vibrating at 110 Hz was detected by the acceleration sensor 130. The frequency of the vibration generated in the seat 11 of the driving vehicle 10 is detected by the acceleration sensor 130, with the actuator 110 not driven. The frequency of the vibration at 110 Hz falls within the predetermined frequency band from f10 to f12 (80 Hz to 120 Hz) for the first frequency f11 (100 Hz). For this reason, the signal switching unit 142 switches the drive frequency of the drive signal output from the signal output unit 141 from the first frequency f11 (100 Hz) to the second frequency f21 (250 Hz).

When the signal switching unit 142 switches the drive frequency of the drive signal from the first frequency f11 (100 Hz) to the second frequency f21 (250 Hz) as above, the frequency for driving the actuator 110 goes out of the predetermined frequency band from f10 to f12 (80 Hz to 120 Hz) including the frequency 110 Hz of the vibration generated in the seat 11 of the moving vehicle 10 to notify the user of approaching the intersection. This allows, when the seat 11 of the moving vehicle 10 generates vibration at 110 Hz, the notification apparatus 100 causes the seat 11 to generate a vibration with a frequency (250 Hz), which is obviously different from the frequency of the vibration caused by the movement, thereby notifying the user that the user is approaching an intersection using the vibration generated in the seat 11.

Assume that event type B shown in FIG. 5 is an event indicating approaching a destination to provide guidance on the route set by the navigation system. The first frequency f12 is 150 Hz, and the second frequency f22 is 350 Hz. A drive signal with the second frequency f22 (350 Hz) is used as the default (initial setting). The predetermined frequency band from f11 to f13 for the first frequency f12 (150 Hz) is assumed to be from 130 Hz to 170 Hz, by way of example. The predetermined frequency band from f21 to f23 for the second frequency f22 (350 Hz) is assumed to be from 320 Hz to 380 Hz, by way of example.

In this case, assume that, when a notification of approaching the destination is given from ECU 12, and the actuator 110 is driven in response to a drive signal with the second frequency f22 (350 Hz), the seat 11 of the moving vehicle 10 vibrating at 330 Hz was detected by the acceleration sensor 130. The frequency of the vibration generated in the seat 11 of the driving vehicle 10 is detected by the acceleration sensor 130, with the actuator 110 not driven. The frequency of the vibration at 330 Hz falls within the predetermined frequency band from f21 to f23 (320 Hz to 380 Hz) for the second frequency f22 (350 Hz). For this reason, the signal switching unit 142 switches the drive frequency of the drive signal output from the signal output unit 141 from the second frequency f22 (350 Hz) to the first frequency f12 (150 Hz).

When the signal switching unit 142 switches the drive frequency of the drive signal from the second frequency f22 (350 Hz) to the first frequency f12 (150 Hz) as above, the frequency for driving the actuator 110 goes out of the predetermined frequency band from (320 Hz to 380 Hz) including the frequency 330 Hz of the vibration generated in the seat 11 of the moving vehicle 10 to notify the user of approaching the destination. This allows, when the seat 11 of the moving vehicle 10 generates vibration at 330 Hz, the notification apparatus 100 causes the seat 11 to generate a vibration with a frequency (150 Hz), which is obviously different from the frequency of the vibration caused by the movement, thereby notifying the user that the user is approaching the destination using the vibration generated in the seat 11.

As discussed above, when the drive frequency of the drive signal is within a predetermined frequency band including the frequency of vibration detected by the acceleration sensor 130, the signal switching unit 142 switches the drive frequency of the drive signal so that the drive frequency of the drive signal goes out of the predetermined frequency band. As a result, the drive frequency of the drive signal output from the signal output unit 141 is switched.

Processing Performed by Controller

The controller 143 determines whether to output cancelling sound waves for cancelling the sound waves induced by the vibration of the actuator 110 from the speaker 120 based on the drive frequency of the drive signal output from the signal output unit 141 to the actuator 110. The cancelling sound waves may be sound waves that are in opposite phase to the sound waves caused by the vibration of the actuator 110.

When the drive frequency of the drive signal that the signal output unit 141 outputs to the actuator 110 is higher than or equal to a threshold frequency, the controller 143 may determine to output cancelling sound waves from the speaker 120.

The threshold frequency may be higher than or equal to 180 Hz and lower than or equal to 220 Hz, for example. The reason why the threshold frequency for the cancelling sound waves is set to be higher than or equal to 180 Hz and lower than or equal to 220 Hz is that the threshold of the drive frequency at which the testee felt the sound waves generated by the actuator 110 due the vibration to be unpleasant was from 180 Hz to 220 Hz. For this reason, the controller 143 monitors the drive frequency of the drive signal output from the signal output unit 141, and when the drive frequency is higher than or equal to the threshold frequency, causes the speaker 120 to output cancelling sound waves. The threshold frequency should be set to an appropriate value higher than or equal to 180 Hz and lower than or equal to 220 Hz. The following is an example in which the threshold frequency is 200 Hz for illustration.

When the controller 143 determines to output cancelling sound waves from the speaker 120, the controller 143 reads cancelling signal data from the memory 144 and supplies a cancelling signal represented by the read cancelling signal data to the speaker 120 to cause the speaker 120 to output cancelling sound waves. Here, the cancelling signal data will be described with reference to FIG. 6.

FIG. 6 is a diagram illustrating the cancelling signal data. The cancelling signal data represents a cancelling signal that the controller 143 supplies to the speaker 120 to cause the speaker 120 to output cancelling sound waves. The cancelling signal data is associated with event types, drive frequencies, and signal patterns related to the cancelling sound waves.

The event type in the cancelling signal data refers to an event type in using the cancelling signal data. The drive frequency in the cancelling signal data is the drive frequency of the cancelling signal and is the same as the drive frequency of the drive signal output from the signal output unit 141 in using the cancelling signal data. Since the controller 143 causes the speaker 120 to output cancelling sound waves when the drive frequency of the drive signal is higher than or equal to the threshold frequency (200 Hz), the drive frequency in the cancelling signal data is higher than or equal to the threshold frequency (200 Hz). Therefore, as shown in FIG. 6, the drive frequency for event type A is f21 (250 Hz), and the drive frequency for event type B is f22 (350 Hz), both of which correspond to the second frequency shown in FIG. 5.

The signal pattern in the cancelling signal data is data representing a cancelling signal pattern, which is a signal pattern for generating cancelling sound waves having a signal pattern in opposite phase to the vibrational sound waves to be cancelled. The vibrational sound waves to be cancelled are one example of sound waves caused by the vibration of the actuator 110.

In the case where the drive signal is an intermittent drive signal that repeats on and off, the signal pattern of the cancelling signal data represents the durations of the on-period and the off-period, the amplitude of pulses during the on-period, the number of the pulses, and so on. The amplitude in the signal pattern in the cancelling signal data is equal to the amplitude of the vibrational sound waves to be cancelled by the cancelling sound waves and causes opposite-phase cancelling sound waves. The amplitude in the signal pattern in the cancelling signal data increases as the drive frequency increases.

More specifically, the controller 143 determines whether to output the cancelling sound waves from the speaker 120 as follows, for example.

When the signal output unit 141 outputs a drive signal with the default first frequency f11 (100 Hz) to the actuator 110 in the case where the event type is A, the controller 143 does not supply a cancelling signal to the speaker 120 because the drive frequency of the drive signal is lower than the threshold frequency (200 Hz).

When the signal output unit 141 outputs the drive signal with the default second frequency f22 (350 Hz) to the actuator 110 in the case where the event type is B, the controller 143 outputs a cancelling signal to the speaker 120 because the drive frequency of the drive signal is higher than the threshold frequency (200 Hz). In this case, the controller 143 reads a signal pattern T2 (see FIG. 6) in the cancelling signal data corresponding to event type B and the drive frequency (second frequency f22) from the memory 144 to generate a cancelling signal and supplies the cancelling signal to the speaker 120. This allows the speaker 120 to output cancelling sound waves in opposite phase to the vibrational sound waves, thereby cancelling the vibrational sound waves with the cancelling sound waves.

When the drive frequency of the drive signal switched by the signal switching unit 142 becomes higher than or equal to the threshold frequency (200 Hz), the controller 143 may supply a cancelling signal to the speaker 120, thereby outputting cancelling sound waves from the speaker 120. In other words, in one example, when the drive frequency of the drive signal is switched from the first frequency f11 (100 Hz) to the second frequency f21 (250 Hz) by the signal switching unit 142, and the signal output unit 141 outputs a drive signal with the second frequency f21 (250 Hz) to the actuator 110, the drive frequency of the drive signal becomes higher than the threshold frequency (200 Hz). For this reason, the controller 143 supplies a cancelling signal to output cancelling sound waves from the speaker 120. In this case, the controller 143 reads a signal pattern T1 (see FIG. 6) in the cancelling signal data corresponding to event type A and the drive frequency (second frequency f21) from the memory 144 to generate a cancelling signal and supplies the cancelling signal to the speaker 120. This allows the speaker 120 to output cancelling sound waves in opposite phase to the vibrational sound waves, thereby cancelling the vibrational sound waves with the cancelling sound waves.

When the drive frequency of the drive signal switched by the signal switching unit 142 is lower than the threshold frequency (200 Hz), the controller 143 does not supply a cancelling signal to the speaker 120. In one example, when the drive frequency of the drive signal is switched from the second frequency f22 (350 Hz) to the first frequency f12 (150 Hz) by the signal switching unit 142, and the signal output unit 141 outputs a drive signal with the first frequency f12 (150 Hz) to the actuator 110, the drive frequency of the drive signal changes to lower than the threshold frequency (200 Hz). For this reason, the controller 143 stops supplying the cancelling signal to the speaker 120.

The controller 143 may generate a cancelling signal capable of outputting cancelling sound waves that are in opposite phase to the sound waves generated ty the vibration of the actuator 110 or remaining vibrations according to the vibration detected by the acceleration sensor 130 and output the cancelling signal to the speaker 120. The notification apparatus 100 may generate, in advance, a cancelling signal to be output to the speaker 120 to cancel sound induced by the vibration of the actuator 110 or the remaining vibrations and store the cancelling signal in the memory 144, and may read the cancelling signal from the memory 144 and output the cancelling signal to the speaker 120.

The memory 144 stores, for example, programs and data necessary for the signal output unit 141, the signal switching unit 142, and the controller 143 to perform control. The drive signal data and the cancelling signal data illustrated in FIG. 5 and FIG. 6, respectively, are also stored in the memory 144.

Waveforms in Cancelling Vibrational Sound Waves with Cancelling Sound Waves

FIG. 7A is a diagram illustrating the waveform of the drive signal. FIG. 7B is a diagram illustrating the vibrational waveform before vibrational sound waves are cancelled. FIG. 7C is a diagram illustrating the waveform of cancelling sound waves. FIG. 7D is a diagram illustrating the vibrational waveform after vibrational sound waves are cancelled. For example, assume that, when the actuator 110 is driven with a drive signal having the waveform illustrated in FIG. 7A, the vibrational waveform of the actuator 110 detected by the acceleration sensor 130 is as shown in FIG. 7B.

In this case, assume that a cancelling signal is supplied to the speaker 120 so that the cancelling sound waves illustrated in FIG. 7C are output from the speaker 120. The cancelling sound waves illustrated in FIG. 7C have a waveform in opposite phase to the vibrational sound waves. When such cancelling sound waves are output from the speaker 120, the vibrational sound waves in the interior of the vehicle 10 are cancelled (offset), and the vibrational waveform of the actuator 110 detected by the acceleration sensor 130 becomes the waveform as illustrated in FIG. 7D.

Flowchart for Processing Performed by Control Unit

Figure 8:
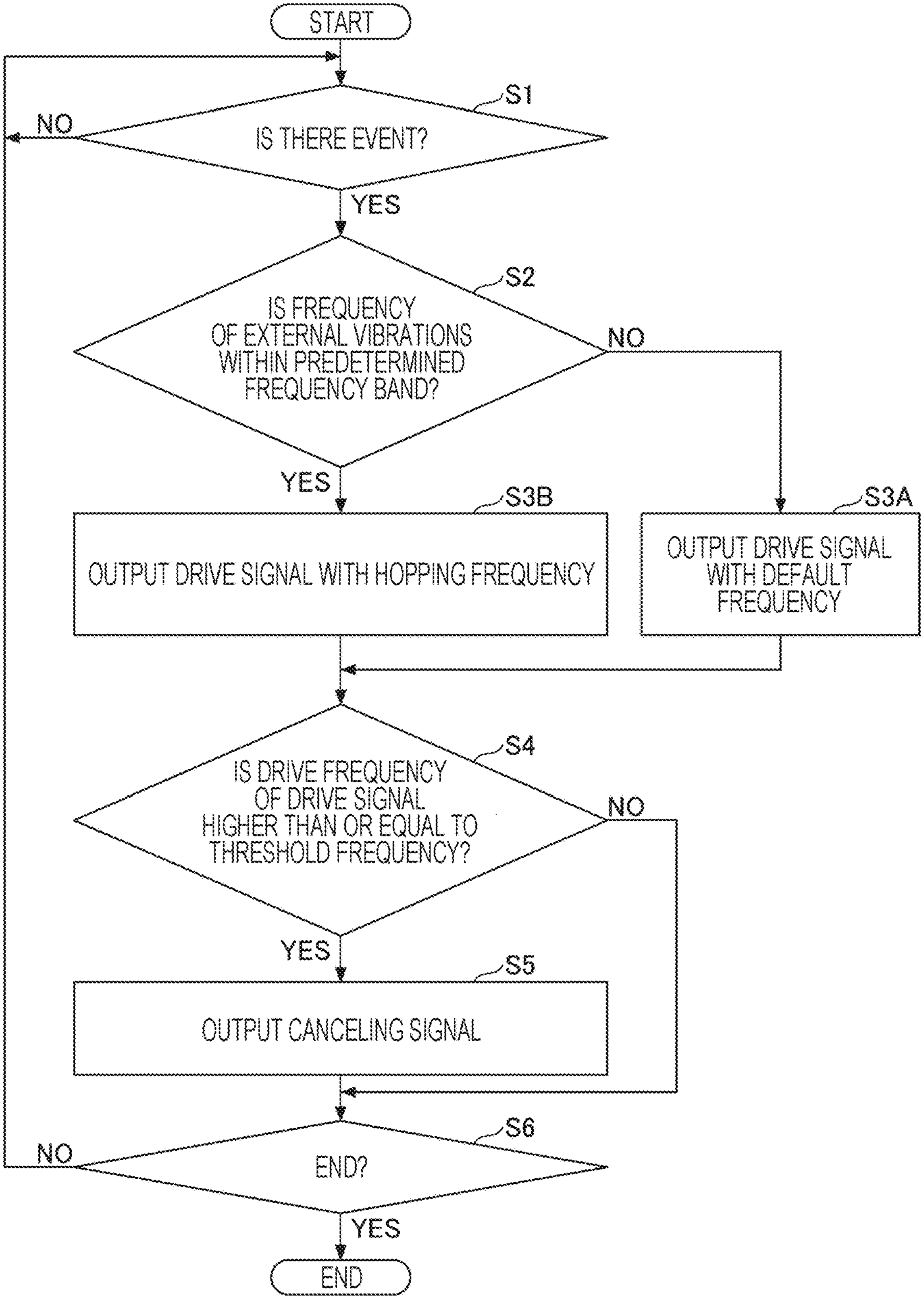
FIG. 8 is a flowchart for the processing performed by a control unit.

FIG. 8 is a flowchart for the processing performed by the control unit 140. The control unit 140 performs the processes of the steps illustrated in FIG. 8 by executing the control program for the notification apparatus according to an embodiment.

When starting the processing, the controller 143 determines whether there is an event (step S1). If the controller 143 determines that there is no event (S1: NO), the controller 143 repeatedly executes the process of step S1.

If the controller 143 determines that there is an event (S1: YES), the signal switching unit 142 determines whether the frequency of external vibrations detected by the acceleration sensor 130 falls within a predetermined frequency band associated with the drive frequency of the drive signal output from the signal output unit 141 (step S2).

If the signal switching unit 142 determines that the frequency of the external vibrations does not fall within the predetermined frequency band (S2: NO), the signal switching unit 142 causes the signal output unit 141 to output a drive signal with a default frequency (step S3A). This causes the actuator 110 to be driven by the drive signal with the default frequency for the generated event.

If in step S2 the signal switching unit 142 determines that the frequency of the external vibrations falls within the predetermined frequency band (S2: YES), the signal switching unit 142 causes the signal output unit 141 to output the drive signal with a hopping drive frequency (step S3B). This changes, for example, the drive frequency of the drive signal to, of the plurality of drive frequencies in the drive signal data, a drive frequency not currently in use (see FIG. 5).

When the process of step S3A or S3B ends, the controller 143 determines whether the drive frequency of the drive signal is higher than or equal to a threshold frequency (step S4).

If the controller 143 determines that the drive frequency of the drive signal is higher than or equal to the threshold frequency (S4: YES), the controller 143 generates a cancelling signal and outputs the cancelling signal to the speaker 120 (step S5). The controller 143 reads cancelling signal data (FIG. 6) from the memory 144 and generates a cancelling signal using a signal pattern corresponding to the current event type and the drive frequency of the drive signal currently output from the signal output unit 141.

Upon completion of the process of step S5, the control unit 140 advances the processing to step S6.

The control unit 140 determines whether to terminate the sequence of processes (step S6). The processing is terminated, for example, when an ignition switch for the vehicle 10 is turned off.

If the control unit 140 determines not to terminate the sequence of processes (S6: NO), the control unit 140 returns the processing to step S1. This is for the purpose of continuing the processing from step S1. In contrast, if the control unit 140 determines to terminate the sequence of processing (S6: YES), the sequence of processes ends (END).

Thus, the controller 143 determines whether to cause the speaker 120 to output cancelling sound waves for cancelling the sound waves induced by the vibration of the actuator 110 based on the drive frequency of the drive signal. This allows for providing the notification apparatus 100 capable of controlling the output of cancelling sound waves depending on the situation, a control program for the notification apparatus, and the seat system 200.

Since the controller 143 causes the speaker 120 to output cancelling sound waves when the drive frequency of the drive signal is higher than or equal to a threshold frequency, the vibrational sound waves induced by the vibration of the actuator 110 can effectively be cancelled.

The drive signal is a signal that vibrates the actuator 110 with a higher acceleration, the higher the drive frequency. The sensitive organ of human skin less senses the vibration of the actuator 110, the higher the drive frequency. For this reason, increasing the acceleration of the drive signal the higher the drive frequency allows the notification apparatus 100 to stably present a tactile sensation due to the vibration to the user even with a higher drive frequency.

The threshold frequency is higher than or equal to 180 Hz and lower than or equal to 220 Hz. The notification apparatus 100 causes the speaker 120 to output cancelling sound waves when the sound waves induced by the vibration of the actuator 110 are unpleasant. This allows the notification apparatus 100 to effectively cancel the vibrational sound waves induced by the vibration of the actuator 110, thereby cancelling the vibrational sound waves with stability.

The notification apparatus 100 includes the acceleration sensor 130 that detects vibration with the actuator 110 not driven and the signal switching unit 142 that switches the drive frequency of the drive signal so that, when the drive frequency of the drive signal falls within a predetermined frequency band including the frequency of the vibration detected by the acceleration sensor 130, the drive frequency of the drive signal falls outside the predetermined frequency band. When the drive frequency of the drive signal switched by the signal switching unit 142 is higher than or equal to the threshold frequency, the controller 143 causes the speaker 120 to output cancelling sound waves. This allows the notification apparatus 100 to present the user with a tactile sensation due the vibration with a frequency different from external vibrations by hopping the drive frequency of the drive signal in a state in which the drive frequency of the drive signal and the frequency of the external vibrations are close to each other so that the user cannot distinguish between the vibration of the actuator 110 and the external vibrations. When the drive frequency changed by hopping is higher than or equal to the threshold frequency, the controller 143 causes the speaker 120 to output cancelling sound waves. This allows the notification apparatus 100 to effectively cancel the vibrational sound waves induced by the vibration of the actuator 110.

Since the cancelling sound waves are in opposite phase to the sound waves induced by the vibration of the actuator 110, the vibrational sound waves can be effectively cancelled by the cancelling sound waves. The notification apparatus 100 can present a tactile sensation due to vibration to the user, with the sound due to unwanted vibrational sound waves reduced. The notification apparatus 100 can present a tactile sensation due a high-quality vibration by reducing unwanted sounds.

The drive signal may have an intermittent drive pattern with an on-period during which pulse waves continue and an off-period during which no pulse waves present. The cancelling sound waves are in opposite phase to the sound waves induced by the remaining vibrations of the actuator 110 during the off-period. This allows the notification apparatus 100 to reduce or eliminate generation of sound waves due to remaining vibrations, if generated during the off-period, by canceling the remaining vibrations, thereby presenting a tactile sensation due to a high-quality vibration.

The drive signal has an intermittent drive pattern with an on-period during which pulse waves with a frequency higher than or equal to 50 Hz and lower than or equal to 400 Hz continues for 40 milliseconds or more and an off-period during which no pulse waves are present. This allows the notification apparatus 100 to generate a vibration in a frequency band in which vibrational sound waves can easily be cancelled by the cancelling sound waves and to present a tactile sensation due to a mechanically generated vibration to the user.

The speaker 120 outputs the cancelling sound waves in a direction different from the direction in which the user's body is positioned with respect to the object, such as the seat 11. This allows the notification apparatus 100 to output the cancelling sound waves in the directions different from the position of the user's body to cancel the vibrational sound waves effectively. This allows the notification apparatus 100 to present a tactile sensation due to a high-quality vibration.

Having described a notification apparatus, a control program for the notification apparatus, and a seat system according to exemplary embodiments of the present disclosure, it is to be understood that the present disclosure is not limited to the specifically disclosed embodiments, and various modifications and changes can be made without departing from the claims.

This international application claims priority to Japanese Patent Application No. 2021-173709 filed on Oct. 25, 2021, which is hereby incorporated by reference in its entirety.

What is claimed is:

1. A notification apparatus attached to an object, the notification apparatus alerting a user who uses the object by presenting a tactile sensation due to vibration, the notification apparatus comprising:

a signal output unit configured to output a drive signal having a signal pattern with a drive frequency corresponding to an event type;

an actuator configured to be driven by the drive signal;

a sound output unit configured to output sound waves; and a controller configured to determine whether to output cancelling sound waves for cancelling sound waves induced by vibration of the actuator from the sound output unit based on a drive frequency of the drive signal that has caused the actuator to be driven.

2. The notification apparatus according to claim 1, wherein, when the drive frequency of the drive signal is higher than or equal to a threshold frequency, the controller causes the sound output unit to output the cancelling sound waves.

3. The notification apparatus according to claim 2, wherein the drive signal is a signal for vibrating the actuator with higher acceleration as the drive frequency increases.

4. The notification apparatus according to claim 2, wherein the threshold frequency is higher or equal to 180 Hz and lower than or equal to 220 Hz.

5. The notification apparatus according to claim 2, further comprising:

a vibration detector configured to detect vibration, with the actuator not driven; and a signal switching unit configured to, when the drive frequency of the drive signal falls within a predetermined frequency band including a frequency of the vibration detected by the vibration detector, switch the drive frequency of the drive signal to fall outside the predetermined frequency band, wherein, when the drive frequency of the drive signal switched by the signal switching unit is higher than or equal to the threshold frequency, the controller causes the sound output unit to output the cancelling sound waves.

6. The notification apparatus according to claim 1, wherein the cancelling sound waves are in opposite phase to the sound waves induced by the vibration of the actuator.

7. The notification apparatus according to claim 6, wherein the drive signal has an intermittent drive pattern including an on-period during which pulse waves continue and an off-period during which no pulse waves are present, wherein, during the off-period, the cancelling sound waves are in opposite phase to sound waves induced by remaining vibrations of the actuator.

8. The notification apparatus according to claim 1, wherein the drive signal has an intermittent drive pattern including an on-period during which pulse waves with a frequency higher than or equal to 50 Hz and lower than or equal to 400 Hz continues for 40 milliseconds or more and an off-period during which no pulse waves are present.

9. The notification apparatus according to claim 1, wherein the sound output unit outputs the cancelling sound waves in a direction different from a direction in which a body of the user is positioned with respect to the object.

10. A non-transitory computer-readable medium for storing a control program for a notification apparatus attached to an object, the notification apparatus alerting a user who uses the object by presenting a tactile sensation due to vibration, the notification apparatus including:

an actuator configured to generate vibration; and a sound output unit configured to output sound waves, the non-transitory computer-readable medium for causing a computer of the notification apparatus to execute a process by a processor so as to perform the steps of:

outputting a drive signal having a signal pattern with a drive frequency corresponding to an event type to vibrate the actuator;

supplying the drive signal to cause the actuator to be driven; and determining whether to output cancelling sound waves for cancelling sound waves induced by vibration of the actuator from the sound output unit based on a drive frequency of the drive signal that has caused the actuator to be driven.

11. A seat system comprising:

a seat; and a notification apparatus configured to alert a user by presenting a tactile sensation due to vibration, wherein the notification apparatus includes:

a signal output unit configured to output a drive signal having a signal pattern with a drive frequency corresponding to an event type;

an actuator configured to be driven by the drive signal;

a sound output unit configured to output sound waves; and a controller configured to determine whether to output cancelling sound waves for cancelling sound waves induced by vibration of the actuator from the sound output unit based on a drive frequency of the drive signal that has caused the actuator to be driven.

* * * * *